Sept. 19, 1939.  W. L. GROENE  2,173,608
CHANGE SPEED FRICTION GEARING
Filed Feb. 25, 1937  2 Sheets-Sheet 1
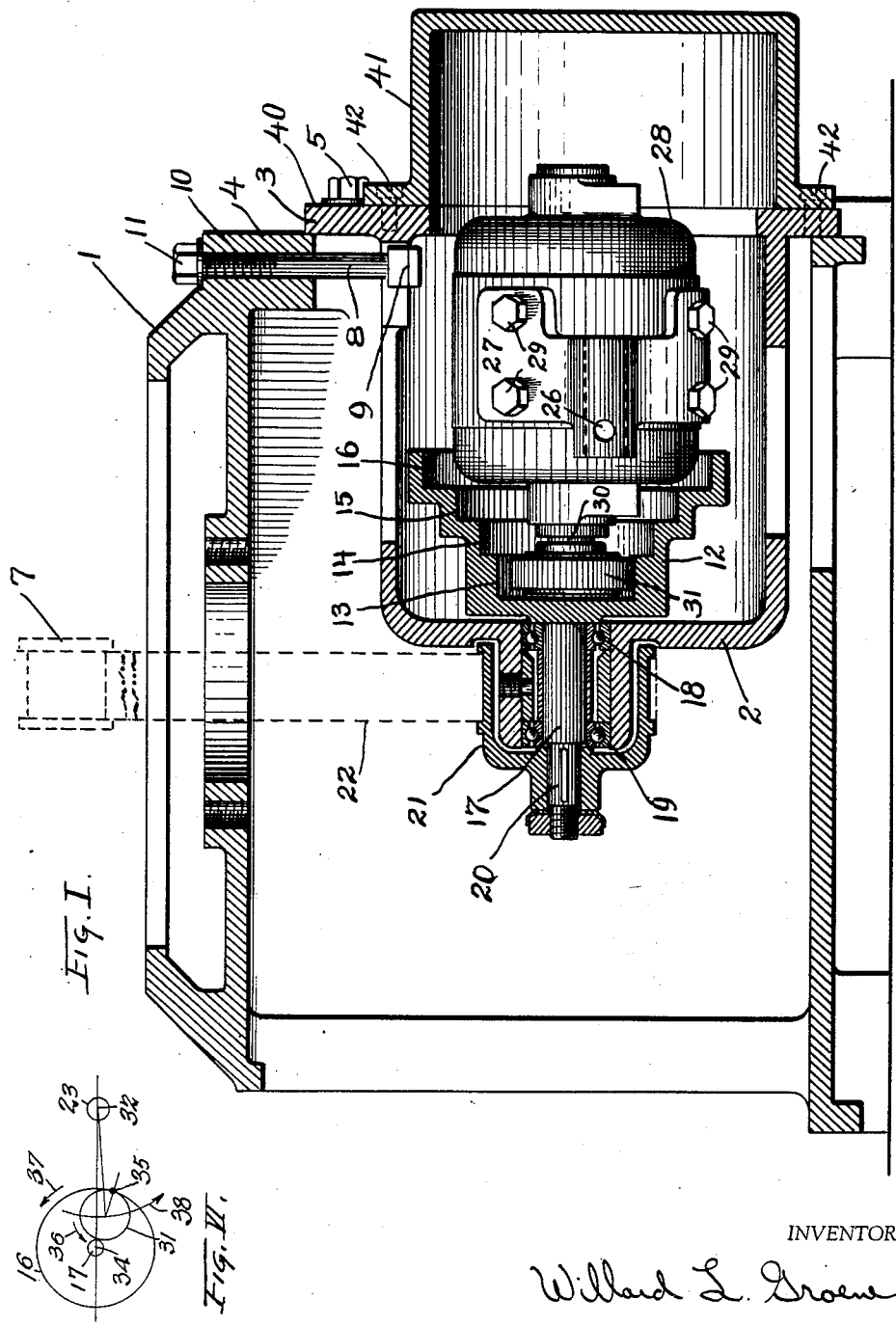
INVENTOR.
Willard L. Groene

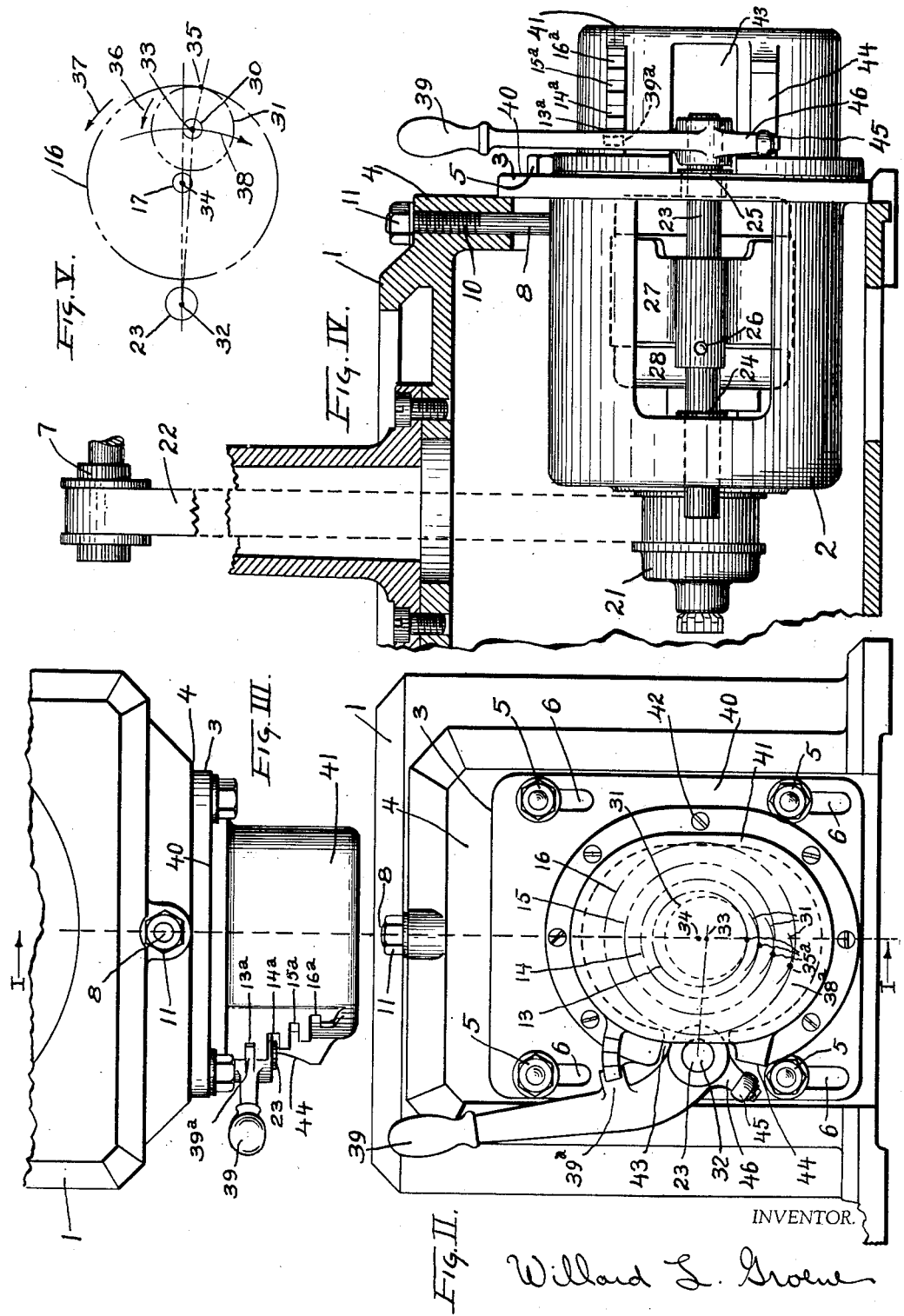

Patented Sept. 19, 1939

2,173,608

UNITED STATES PATENT OFFICE 2,173,608

CHANGE SPEED FRICTION GEARING

Willard L. Groene, Cincinnati, Ohio, assignor to R. K. Le Blond Machine Tool Company, Cincinnati, Ohio, a corporation of Delaware Application February 25, 1937, Serial No. 127,630

4 Claims. (Cl. 74—190)

This invention pertains to friction gearing wherein a plurality of different speeds are obtained from a constant speed source of power.

An object of my invention is to provide a change speed friction gearing which is compact in design in which the axis of rotation of the constant speed source of power is maintained substantially co-axial with the axis of rotation of the driven member.

Another object is to provide in a change speed friction gearing a pivotally mounted constant speed driving motor having a driving disc adapted to selectively engage a series of stepped internal sheaves of a member to be driven whereby a plurality of different speeds may be obtained from said driven member.

A further object of my invention is to provide a friction gearing comprising a pivotally mounted motor having a driving disc adapted to internally engage a sheave of a member to be driven in such a manner that the axis of the pivot, the driving motor, and the member to be driven are maintained substantially in the same plane to thereby provide a wedging action between the driving disc and the sheave which varies in direct proportion to the load imposed on the driven member.

A still further object is to provide a friction gearing comprising a pivotally mounted motor having a driving disc adapted to internally engage a sheave of a member to be driven in such a manner that the axis of the pivot and the motor lie in a plane substantially perpendicular to the plane passing through the axis of the motor and the member to be driven to thereby provide a substantially constant driving contact between the driving disc and the sheave.

It is also my intention to provide in a change speed friction gearing simple and effective means for making the speed changes irregardless as to whether the gearing is operating or not operating.

It is further my intention to provide a means for bodily moving the change speed friction gearing relative to other mechanism to be driven by the gearing without in any way effecting the full functioning thereof.

Further objects of the invention will appear from the detailed description of the drawings in which:

Figure I is an elevation partly in section on line I—I of Figures II and III particularly showing the driving motor with the driving disc engaging a sheave of the driven member.

Figure II is an end elevation axially of the motor and driven member particularly showing the shifting lever for the motor for effecting speed changes.

Figure III is a plan view of a portion of the mechanism shown in Figure II.

Figure IV is an elevation partly in section on line I—I of Figures II and III particularly showing the pivotal mounting for the motor and the shifting mechanism associated with said mounting.

Figure V is a diagrammatic illustration of the relationship of the axes of the pivot, the motor, and the driven member when wedging action is to be incorporated in the apparatus.

Figure VI is a diagrammatic illustration of the relationship of the parts when the axis of the motor is located between the axis of the pivot and the axis of the driven member.

As an exemplary embodiment of my invention I show the change speed friction gearing mounted in a supporting base 1 of an apparatus 7 to be driven. The gearing is mounted in a supporting housing 2 which has an integral flange 3 which abuts against the face 4 of the base 1 and which is secured thereagainst by suitable bolts 5 threaded in base 1 and passing through the slotted holes 6 in the flange 3.

Suitable means are provided for moving the housing 2 relative to the base 1 and apparatus 7 to be driven mounted thereon comprising a stud 8 attached to the housing 2 by any suitable means which passes through a clearance bore 10 in base 1, a suitable adjusting nut 11 being provided for moving the stud 8 axially of the bore 10 to thereby move the housing 2 when the bolts 5 are loosened.

The driven member 12, having the various internal sheaves 13, 14, 15, and 16, has a shaft portion 17 which is appropriately journaled on anti-friction bearings 18 and 19 mounted in the housing 2. On the output end 20 of the shaft 17 may be mounted any suitable power transmission mechanism such as the pulley 21 which may drive the belt 22 for driving apparatus 7.

The rock shaft 23 is mounted for rotation and axial movement in the bushing 24 fixed in the housing 2 and the bushing 25 fixed in the flange 3. Fixed on the rock shaft 23 intermediate the bushings 24 and 25 by a suitable pin 26 is the motor cradle 27 to which the driving motor 28 is suitably fixed by means of bolts 29. On the motor shaft 30 is mounted a driving disc 31, preferably of composition material, which is adapted to drivingly engage the sheaves 13, 14, 15, and 16 by appropriately rocking and axially moving the rock shaft 23.

One arrangement is to have the axis 32 of the rock shaft 23, the axis 33 of the motor shaft 30 and the axis 34 of the driven shaft 17 substantially in a single plane as shown in Figure V. The driving disc 31, in this instance, contacts the sheave (16 for example) at a point 35 and considering the motor as rotating counter clockwise as shown by arrow 36, the sheave 16 will be likewise rotated in the same direction as shown by arrow 37. When resistance is set up against the rotation of the sheave, as in performing its normal driving function, the disc 31 will attempt to roll clockwise about the sheave causing the motor 28 to pivot about the axis 32 of the rock shaft 23 so that the axis 33 of the motor shaft 30 moves in the arcuate path indicated by arrow 38. Since the sheave has a greater curvature than the arcuate path 38 it can be seen that the disc will be wedged against the sheave at a point 35 and that this wedging action will be proportional to the amount of resistance or load to which the sheave is subjected.

The initial contact of the driving disc 31 and the sheave may be accomplished by any resilient means for yieldingly urging the motor lightly along the path 38, such for example as is shown in Figure V wherein the rock shaft 23 is so positioned that the motor 28 is automatically swung downwardly in the path 38 by gravity. Other means, such as appropriately arranged springs may be utilized in cases where it is not practicable to position the rock shaft as shown in Figure V.

While in Figure V I have shown the axis 34 of the sheave 16 lying between the axis 32 of the rock shaft 23 and the axis 33 of the motor shaft 30, the arrangement will function equally well in cases where the axis 33 of the motor shaft 30 is positioned between the axis 32 of the rock shaft 23, and the axis 34 of the sheave 16, the requisite to proper functioning of either arrangement being that said three axes be substantially in the same plane, and that the axis 32 of the rock shaft 23 should in no instance coincide with the axis 34 of the sheave 16.

In Figure VI is shown such an arrangement wherein the axis 33 of the motor shaft 30 is positioned between the axis 32 of rock shaft 23 and axis 34 of the sheave 16.

Another arrangement is that shown in Figure II wherein the axis 32 of the rock shaft 23 and the axis 33 of the motor shaft 30 are maintained in a plane substantially perpendicular to the plane defined by the axis 33 of the motor shaft 30 and the axis 34 of the sheaves 13, 14, 15, and 16. The motor 28 is adapted to be swung about the axis 32 so that its axis 33 may be swung and moved axially in the arcuate path 38a for the proper engagement of the driving disc 31 at the points 35a on the sheaves 13, 14, 15, and 16. In this instance driving contact is maintained at the points 35a by suitable resilient means, in this particular instance the rock shaft 23 being so positioned that the motor 28 is automatically swung downwardly in path 38a to establish proper contact. In this arrangement the driving control at the points 35a is maintained by the weight of the motor 28. Springs may be used equally well in instances where the rock shaft can not be positioned as shown in Figure II.

In order to provide means for shifting the motor 28 for obtaining speed changes a shifter handle 39 is fixed on the rock shaft 23. On the outer face 40 of the flange 3 is mounted a cover 41 by suitable screws 42, the cover having a slotted opening 43 to permit axial movement of the rock shaft 23, and the handle 39. Formed on the cover 41 is a series of locating slots 13a, 14a, 15a, and 16a corresponding to the respective sheaves 13, 14, 15, and 16 which are engageable by the locating finger 39a of the handle 39 to guide the handle for proper engagement of the driving disc 31 with sheaves. A stop 44 is also provided on the cover 41 which is engaged by a roller 45 mounted on the projection 46 of the handle 39, the purpose of which is to provide means to prevent swinging the driving disc too far from the driving positions 35 which would result in damage to the disc in striking the sheaves while being shifted axially.

Having fully set forth and described my invention, what I claim as new and desire to secure by United States Letters Patent is:

1. In a friction gearing, a housing, a motor pivotally mounted on said housing, a driven member having an internal sheave rotatably mounted on said housing, and a driving disc mounted on said motor engaging said sheave, the axes of said pivot, said motor, and said driven member being maintained substantially in a plane, the axis of said driven member being located between said other axes.

2. In a friction gearing, a housing, a motor pivotally mounted on said housing, a driven member having an internal sheave rotatably mounted on said housing, and a driving disc mounted on said motor engaging said sheave, the axes of said pivot, said motor, and said driven member being maintained substantially in a plane, the axis of said motor being located between said other axes.

3. In a friction gearing, a housing, a motor pivotally mounted on said housing, a driven member having an internal sheave rotatably mounted on said housing, and a driving disc mounted on said motor engaging said sheave, the axes of said pivot, said motor, and said driven member being maintained substantially in a horizontal plane, the axis of said driven member being located between said other axes.

4. In a friction gearing, a housing, a motor pivotally mounted on said housing, a driven member having an internal sheave rotatably mounted on said housing, and a driving disc mounted on said motor engaging said sheave, the axes of said pivot, said motor, and said driven member being maintained substantially in a horizontal plane, the axis of said motor being located between said other axes.

WILLARD L. GROENE.